Nov. 22, 1932.  C. W. KUHN  1,888,274
DRIVING MECHANISM FOR VALVES AND OTHER DEVICES
Filed Dec. 17, 1927  2 Sheets-Sheet 1
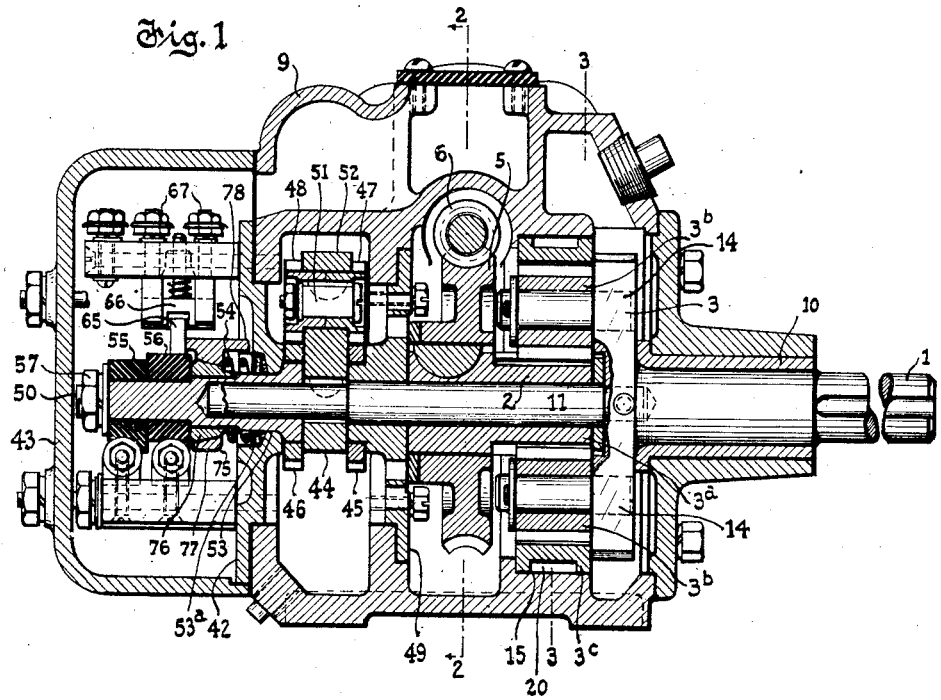
INVENTOR.
Clarence W. Kuhn
BY Frank A. Hubbard
ATTORNEY.

Nov. 22, 1932.   C. W. KUHN   1,888,274
DRIVING MECHANISM FOR VALVES AND OTHER DEVICES
Filed Dec. 17, 1927   2 Sheets-Sheet 2
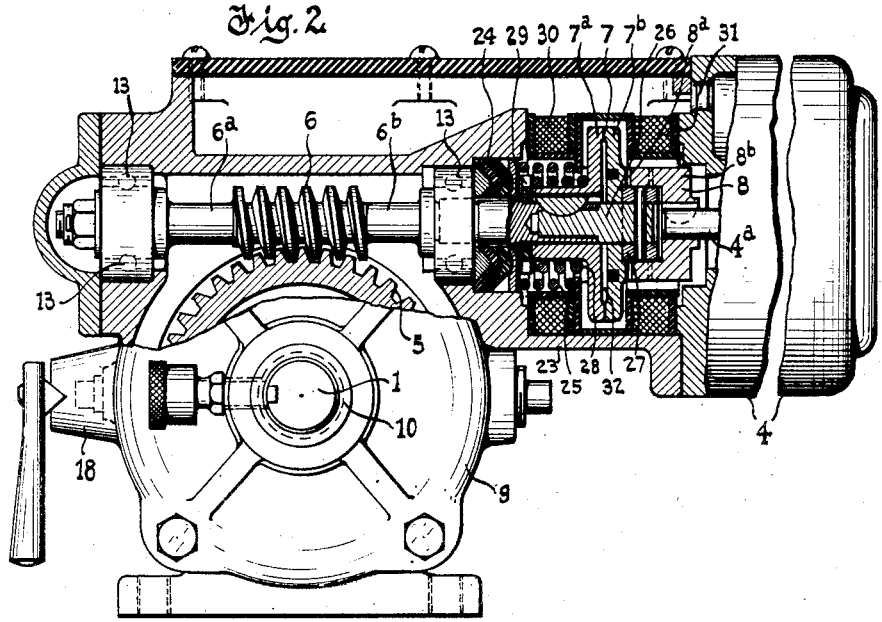
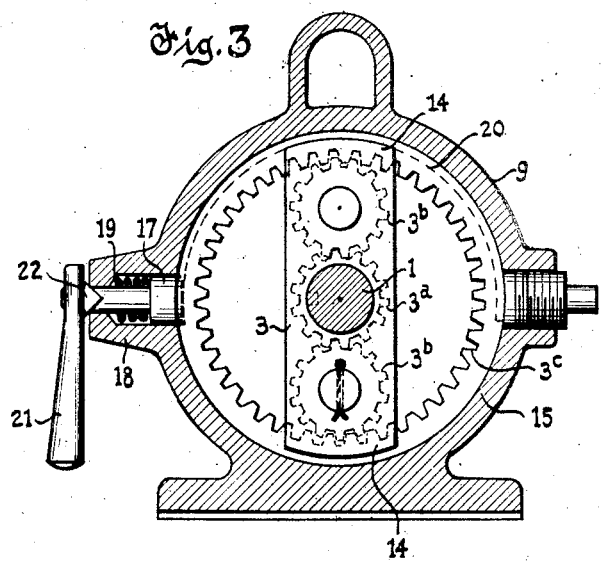
INVENTOR.
Clarence W. Kuhn.
BY
ATTORNEY.

Patented Nov. 22, 1932

1,888,274

UNITED STATES PATENT OFFICE

CLARENCE W. KUHN, OF MILWAUKEE, WISCONSIN, ASSIGNOR, BY MESNE ASSIGNMENTS, TO CUTLER-HAMMER INC., OF MILWAUKEE, WISCONSIN, A CORPORATION OF DELAWARE

DRIVING MECHANISM FOR VALVES AND OTHER DEVICES

Application filed December 17, 1927. Serial No. 240,823.

This invention relates to driving mechanisms for valves and other devices.

The invention has among its objects to provide a motor driven valve operating mechanism of improved construction which insures tight seating of the valve without danger of damaging the seating surfaces thereof due to inertia of the moving parts added to the torque of the motor at the end of travel.

Another object is to provide a valve operating mechanism of the aforesaid character which provides a predetermined operating force for seating of the valve and which also provides sufficient operating force to effect unseating of the valve without imposing excessive strains upon the motor.

Another object is to provide a valve operating mechanism of the aforesaid character having improved means associated therewith for controlling the driving motor to provide for efficient and reliable operation of the mechanism.

Another object is to provide a motor driven valve operating mechanism having improved means associated therewith for timing interruption of the power connections for the motor upon movement of the operating mechanism into its closed position.

Various other objects and advantages of the invention will hereinafter appear.

The accompanying drawings illustrate an embodiment of the invention which will now be described, it being understood that the mechanism illustrated may be modified in numerous respects without departing from the spirit and scope of the appended claims.

In the drawings,

Figure 1 is a sectional view of a valve operating mechanism embodying the invention.

Figs. 2 and 3 are sectional views taken substantially on lines 2—2 and 3—3, respectively, of Fig. 1.

Fig. 4 is a plan view of the limit switch mechanism, the cover therefor being shown in section, and Fig. 5 is a diagrammatic view of a control system for the mechanism.

Referring to Figs. 1 and 2, the same illustrate a driving mechanism including a driven shaft 1, a driving member 2, a planetary speed reducing gear 3 for establishing a driving connection between said shaft and said member and a motor 4 operatively connected to the driving member 2 through the medium of a worm wheel 5, a cooperating worm 6, a slip clutch 7, and a jaw coupling 8. These parts are all mounted within an enclosing casing 9 and the motor 4 is provided with a housing which is fixed to said casing.

The driven shaft 1 is rotatable within a bearing 10 in casing 9, and the same has a shaft extension 11 fixed thereto upon which the driving member 2 is rotatably mounted. Worm wheel 5 is keyed to the driving member 2, while the worm 6 is provided with integral shaft extensions $6^a$ and $6^b$ on opposite sides thereof which are supported by suitable ball bearings 13—13. The planetary gear 3 includes a pinion $3^a$ formed on the driving member 2, a plurality of pinions $3^b$ carried by oppositely projecting arms 14 on the driven shaft 1 and an internally toothed ring gear $3^c$, pinions $3^b$ being arranged between and in mesh with the pinion $3^a$ and the ring gear $3^c$. Ring gear $3^c$ is revolubly mounted in a bearing 15 on the interior of casing 9 (Fig. 1), and it is apparent that restraint of said ring gear renders the planetary gear effective as a driving connection between the driving member 2 and driven shaft 1, whereas release of said ring gear will permit rotation thereof for release of said driving member from said driven shaft.

The means employed for restraining the ring gear $3^c$ includes a pin 17 slidably mounted within a bored projection 18 on one side of the enclosing casing 9 (Fig. 3). Pin 17 is biased to engage the ring gear $3^c$ by a spring 19, and the same is adapted to project into a channel 20 in the periphery of the ring gear $3^c$. As best shown in Fig. 3, the channel 20 extends only partially around the ring gear $3^c$ and the end walls of said channel are adapted to cooperate with the pin 17 to permit rotation of said ring gear through an angle of substantially 180 degrees upon starting of motor 4 in opposite directions. Thus a lost motion connection is provided which enables the motor to accelerate with practically no load and to acquire sufficient momentum to initiate the operation of shaft 1 with a hammer like blow through sudden arrest of the ring gear 3ᶜ.

The pin 17 is provided with means for withdrawing the same from channel 20, said means comprising a handle 21 fixed to said pin and having a V-shaped projection 22 thereon which cooperates with a V-shaped recess in the outer face of projection 18. By locating handle 21 so that the projection 22 thereof is seated within the cooperating recess in projection 18, the pin 17 is permitted to move under the action of spring 19 into the channel 20 in ring gear 3ᶜ. However, by rotating said handle so as to move the projection 22 out of the cooperating recess in projection 18, pin 17 is withdrawn from channel 20 to permit free rotation of the ring gear 3ᶜ and thereby enable the valve to be manually operated by means of the usual hand wheel.

As before stated, the driving connections between the motor 4 and the driving member 2 include a slip clutch 7 and a jaw coupling 8. These parts are housed within a hollow cylindrical extension 23 on the enclosing casing 9. The left hand end of extension 23 is closed by a gland 24 having a packing which is held under compression by a spring 25 and the outer end of said extension is provided with a flange to which the motor 4 is secured. As best shown in Fig. 2, the slip clutch 7 includes cooperating disk members 7ᵃ and 7ᵇ, the former being keyed to the shaft extension 6ᵇ of worm 6, and being free to slide thereon and the latter being rotatably mounted upon a shaft 26. Shaft 26 is fixed to the end of shaft extension 6ᵇ and for purposes hereinafter set forth the same is constructed of non-magnetic material. Shaft 26 has a thrust collar 27 fixed to the end thereof for limiting movement of slip clutch member 7ᵇ towards the right (Fig. 2), and the slip clutch member 7a is held in engagement with the slip clutch member 7ᵇ by a coil spring 28. Spring 28 is held under compression between the slip clutch member 7ᵃ and a collar 29 which abuts a shoulder on the shaft extension 6ᵇ. The jaw coupling 8 hereinbefore referred to comprises jaw parts 8ᵃ which are formed on the slip clutch member 7ᵇ and a cooperating jaw member 8ᵇ which is fixed to the shaft 4ᵃ of motor 4.

In connection with the foregoing it should be noted that the spring 28 can be designed to permit slippage of the clutch parts 7ᵃ and 7ᵇ when the torque transmitted therethrough exceeds a given value. In practice said spring is designed to render the slip clutch 7 capable of transmitting sufficient torque to effect tight closure of the valve without danger of damaging the valve seats or producing excessive strains on the driving mechanism. On the other hand, it should be noted that when the valve is in either open or closed position the aforedescribed lost motion connection enables the motor 4 to act through the slip clutch 7 to impart a hammer-like blow to the valve to start the same out of such position.

In some instances it is desirable to render the slip clutch 7 capable of transmitting an increased torque for starting the valve out of its open and closed positions. For this purpose the slip clutch 7 has electromagnetic windings 30 and 31 associated therewith which are adapted to act during initial movement of the valve mechanism out of opposite limits. The windings 30 and 31 are mounted upon suitable insulating spools which are supported within the projection 23 of the enclosing casing 9. Said windings are so arranged that the magneto-motive forces thereof are in the same direction and it will be noted that the flux produced thereby will extend in a closed loop through the projection 23 on the enclosing casing and through the slip clutch members 7ᵃ and 7ᵇ to cause said slip clutch members to be attracted towards each other to increase the friction therebetween. In order to obtain maximum effectiveness of said windings the flux produced thereby is concentrated adjacent the peripheries of the slip clutch members by undercutting the faces of said members to provide an air gap 32 therebetween and by constructing the shaft 25 of non-magnetic material, as hereinbefore set forth.

The motor 4 is controlled by a limit switch mechanism 40 through the medium of apparatus which will be hereinafter described, while the windings 30 and 31 are controlled by a switch mechanism 41. The switch mechanisms 40 and 41 are mounted upon a plate 42 which is fixed to casing 9 and said switch mechanisms are enclosed by a cover 43. The switch mechanisms 40 and 41 are provided with operating parts which will be hereinafter more fully described, and said operating parts are driven from the shaft extension 11 of driven shaft 1 through the medium of a speed reducing gear 44.

The speed reducing gear 44 is of the epicyclic type, and as best shown in Fig. 1, the same includes spur gears 45 and 46 and pinions 47 and 48. Spur gear 45 is fixed to a plate 49 which is secured to lugs on the interior of the enclosing casing 9, and spur gear 46 is fixed to a shaft 50. Pinions 47 and 48 mesh with the spur gears 45 and 46, respectively, and said pinions are fixed to a pin 51 and are rotatably mounted within an opening in an arm 52 fixed to the shaft extension 11. The pitch diameters of the several gears of the epicyclic train are such that upon rotation of arm 52 with shaft 11 the pinions 47 and 48 cooperate with the spur gears 45 and 46 to drive shaft 50 from shaft 11 at a greatly reduced speed. Shaft 50 is bored to receive the end of shaft extension 11, and the same extends outwardly through a bearing 53 in plate 42. Bearing 53 is provided with packing washers 53ᵃ which are held under compression by a spring 54.

The limit switch mechanism 40 is controlled by cams 55 and 56 which are formed of insulating material. Each of said cams comprises a circular collar bored to receive shaft 50 and having a flat face on the periphery thereof. Said cams are loose on shaft 50 to permit angular adjustment thereof, and the same are adapted to be clamped in their adjusted positions against a shoulder on said shaft by a clamping nut 57. The cam members 55 and 56 cooperate with spring contact fingers 58 and 59, respectively, carried by an insulating base 61 which is secured to the plate 42. The contact fingers 58 and 59 each have one end fixed to the base 61 and the free end of each cooperates with a stationary contact fixed to said base. The contact fingers 58 and 59 are biased upwardly to open position and each is adapted to be closed by the circular part of its cooperating cam and to open when engaged by the flat face thereof. As hereinafter set forth, the cams 55 and 56 are set so that movement of the valve operating mechanism into one of its limits effects opening of contact finger 58, while movement of said mechanism into its other limit effects opening of contact finger 59.

The switch mechanism 41 hereinbefore referred to is operated from shaft 50 by means of a V-shaped cam 65 which is formed of insulating material and cooperates with a movable contact 66. The contact 66 is movable in opposite directions between two pairs of stationary contacts 67 and 68 fixed to an insulating base 69 mounted on plate 42. The bridging contact 66 is provided with a pin projection 70 which extends through an opening in the base 69 and the same is biased towards its associated cam operating element 65 by a spring 71. The arrangement is such that a given movement of element 65 in a clockwise direction from the position shown in Fig. 4 effects snap movement of the bridging contact 66 into engagement with the contacts 67 while return movement of cam element effects snap movement of said contact into engagement with the set of stationary contacts 68. The cam element 65 is operatively connected to the shaft 50 through the medium of a slip clutch 75. Said slip clutch includes a cone member 76 fixed to shaft 50 and a cooperating member 77 having a cone opening therein for receiving said cone member. Cam element 65 is fixed to member 77 and the latter is held in frictional engagement with the cone member 75 by the spring 54 hereinbefore referred to. Movement of member 77 in opposite directions is limited by a projection 78 thereon which cooperates with shoulders 79 and 80 on plate 42.

Upon initial movement of shaft 50 in opposite directions the same acts through the medium of slip clutch 75 and cam element 65 to operate the contact 66 and upon movement of member 77 into either of its limits the slip clutch 75 acts to permit continued operation of shaft 50.

Referring now to Fig. 5, the same diagrammatically illustrates the driving motor 4 of the aforedescribed mechanism. Any type of driving motor may be employed but in the system illustrated a direct current series motor is shown. Motor 4 is controlled by a pair of double pole electromagnetic reversing switches 81 and 82 and it is assumed that switch 81 established connections from lines $L^1$—$L^2$ for operation of the motor in a direction to open the valve while switch 82 establishes connections from said lines for operation of the motor in its valve closing direction. The energizing circuit of switch 81 is controlled by a normally closed push button 83, a normally open push button 84 and by the spring contact finger 58 of the valve operating mechanism. Switch 82 is controlled by an electroresponsive timing relay 85 which is normally open and is provided with a dash pot for retarding opening movement thereof. Relay 85 is controlled by the normally closed push button 83, a normally open push button 86 and by the spring contact finger 59 of the valve operating mechanism. Switches 81 and 82 are provided with auxiliary contacts 81ᵇ and 82ᵇ for shunting push buttons 84 and 86 respectively, and said switches are also provided with auxiliary contacts 81ᶜ and 82ᶜ which serve as hereinafter set forth to control the slip clutch windings 30 and 31 through the medium of the switch mechanism 41. The control system further includes signal lamps 88 and 89 which are controlled as hereinafter set forth to indicate the direction of operation of the motor 4.

The operation of the control system will now be more fully described. With the valve in open position contact finger 59 is closed and depression of push button 86 establishes an energizing circuit for the timing relay 85 extending from line $L^1$ through the normally closed push button 83, through the contact finger 59 to and through the operating winding 85ᵃ of said timing relay and thence through the push button 86 to line $L^2$. In responding the timing relay 85 establishes an energizing circuit for the operating winding of reversing switch 82 extending from line $L^1$, through the normally closed push button 83, through the contacts of said timing relay and thence through the operating winding 82ᵃ of said reversing switch and the push button 86 to line $L^2$. In responding switch 82 connects the motor to lines $L^1$—$L^2$, such connections being apparent from the drawings and requiring no description and the same also maintains itself in closed position through closure of its auxiliary contacts 82$^b$ which shunt the push button 86.

The motor now operates to close the valve and during initial operation thereof the ring gear 3$^c$ rotates to permit acceleration of the motor and is then arrested to initiate operation of the valve with a hammer-like blow. During closure of the valve the contact finger 59 opens to interrupt the aforedescribed energizing circuit for the timing relay 85. Timing relay 85 then opens against the action of its dash pot 85$^b$ to interrupt the aforedescribed energizing circuit for the reversing switch 82. In this connection it should be noted that the timing relay 85 can be adjusted to open either before or after the valve has reached its closed position. The valve can thus be driven into closed position by the motor 4 through the medium of slip clutch 7 or the motor can be deenergized prior to closure of the valve to provide for seating thereof by the inertia of the motor and the driving mechanism. However, it should be noted that regardless of whether or not the valve is closed by either of the above described methods the slip clutch 7 serves to limit the driving force which is transmitted from the motor to the valve.

Assuming now that the valve is in closed position, contact finger 58 is in closed position and depression of push button 84 establishes an energizing circuit for the reversing switch 81 extending from line L$^1$ through push button 83, through contact finger 58 of the valve operating mechanism and thence through the operating winding 81$^a$ of said reversing switch and push button 84 to line L$^2$. In responding switch 81 connects motor 4 to lines L$^1$—L$^2$; such connections being apparent from the drawings and requiring no description, and the auxiliary contacts 81$^b$ shunt push button 84 to establish a maintaining circuit for said switch. During initial operation of the motor in its valve opening direction the ring gear 3$^c$ first rotates to permit acceleration of the motor and is then arrested to initiate operation of the valve with a hammer-like blow. During movement of the valve operating mechanism into its valve opening position the contact finger 58 opens to interrupt the aforedescribed energizing circuit for reversing switch 81, and the motor is then stopped. It should be noted that upon stopping of the valve in open position the slip clutch 7 is adapted to act in the same manner as upon closure of the valve to limit the operating force which is transmitted from the driving motor 4 to the valve.

Assume now that the movable contact 66 of the switch mechanism 41 engages contacts 67 when the valve is in open position and that the same engages contacts 66 when the valve is in closed position. As hereinbefore set forth, the contact 66 is moved with a snap action in opposite directions upon initial operation of the valve operating mechanism in opposite directions. Thus assuming that the valve is in open position, when switch 82 responds to close the valve windings 30 and 31 are momentarily connected across lines L$^1$—L$^2$ through the medium of the stationary contacts 66 of the switch mechanism 41 and the auxiliary contacts 82$^c$ associated with said switch. On the other hand, when switch 81 responds to open the valve windings 30 and 31 are connected across lines L$^1$—L$^2$ through the medium of the contacts 66 of the switch mechanism 41 and the auxiliary contacts 81$^c$ associated with said reversing switch. Thus the windings 30 and 31 are controlled to render the slip clutch 7 capable of transmitting an increased torque during initial movement of the valve operating mechanism in its valve opening or closing directions.

As before stated, signal lamps 88 and 89 are provided for indicating the direction of operation of the motor. The lamp 88 is arranged to be connected across lines L$^1$—L$^2$ upon closure of contact finger 58, while the lamp 89 is arranged to be connected across said lines by the contact finger 59.

What I claim as new and desire to secure by Letters Patent is:

1. The combination with a part to be driven to a definite limit, of a driving motor therefor, and driving connections therebetween including a slip clutch, and a speed reducing gearing, said gearing being connected to said motor through the medium of said clutch and having means associated therewith to provide for initiation of the movement of said part out of said limit with a hammer-like blow.

2. The combination with a part movable between given limits, of a reversible driving motor therefor, and driving connections therebetween including a slip clutch and a speed reducing gearing driven from said motor through the medium of said clutch, said gearing being adapted upon reverse operations of said motor to initiate operation of said part with a hammer-like blow.

3. The combination with a part to be driven to a definite limit, of a reversible driving motor therefor, and driving connections therebetween including a slip clutch and a speed reducing gearing driven from said motor through the medium of said clutch, said slip clutch being adapted to normally transmit a given torque and having means associated therewith for rendering the same capable of transmitting an increased torque during initial movement of said driven part out of said limit and said gearing being adapted to initiate movement of said part out of said limit with a hammer-like blow.

4. A unitary driving mechanism for valves and the like comprising a reversible driving motor, a driven member and driving connections therebetween including a slip clutch and a planetary speed reducing gear driven from said motor through the medium of said slip clutch, said gear including a gear member requiring restraint for power transmission and a stop for said gear member, the latter having a play relative to the former to provide for initiation of the operation of said driven member with a hammer-like blow upon reverse operations of said motor.

5. The combination with a part movable between given limits, of a reversible driving member therefor, a speed reducing driving connection therebetween including cooperating friction parts adapted to slip when the torque transmitted from said motor to said part exceeds a given value, said friction parts being adapted during slippage to transmit a substantially uniform torque, a pair of reversing switches for controlling said motor and control means for said reversing switches including a pair of switches to be operated from said driven part and a timing relay, one of said switches being adapted to directly control one of said reversing switches and the other being adapted to control the other of said reversing switches through the medium of said timing relay.

6. In a valve operating device, in combination, a valve drive shaft, a driving motor therefor, driving connections therebetween including a friction coupling and a speed reduction gearing connected to said motor through the medium of said coupling, said coupling including cooperating driving and driven friction parts adapted to slip with respect to each other upon transmission of a given torque and adapted during slippage to transmit a substantially uniform torque, and means associated with said coupling for rendering the same capable of transmitting an increased torque during initiation of the operation of said shaft.

7. In a valve operating device, in combination, a valve drive shaft, a driving motor therefor, driving connections therebetween including a friction coupling and a speed reduction gearing connected to said motor through the medium of said coupling and having means associated therewith to provide for initiation of the operation of said shaft with a hammer-like blow, said coupling including cooperating driving and driven friction parts adapted to slip with respect to each other upon transmission of a given torque and adapted during slippage to transmit a substantially uniform torque, and means associated with said coupling for rendering the same capable of transmitting an increased torque during initiation of the operation of said shaft.

8. The combination with a valve drive shaft, of a reversible driving motor therefor, driving connections therebetween including a friction coupling having cooperating driving and driven friction elements, spring means associated with said elements for holding the same in engagement to provide for transmission of a given torque and a magnet winding associated with said elements for attracting the same towards each other to provide for transmission of an increased torque.

9. The combination with a valve drive shaft, of a reversible driving motor therefor, driving connections therebetween including a friction coupling having cooperatng driving and driven friction elements, spring means associated with said elements for holding the same in engagement to provide for transmission of a given torque, a magnet winding associated with said elements for attracting the same towards each other to provide for transmission of an increased torque, and a switch mechanism associated with said drive shaft and adapted to energize said winding during initial operation of said driven member in opposite directions.

In witness whereof, I have hereunto subscribed my name.

CLARENCE W. KUHN.